3,636,014
17β-(ALKYLTHIOALKYL)AMINOANDROST - 5-EN-3-OLS, ACYL DERIVATIVES THEREOF AND INTERMEDIATES THERETO
Paul D. Klimstra, Northbrook, Ill., assignor to G. D. Searle & Co., Chicago, Ill.
No Drawing. Filed Oct. 24, 1969, Ser. No. 869,347
Int. Cl. C07c 169/20
U.S. Cl. 260—397.5                    10 Claims

ABSTRACT OF THE DISCLOSURE

17β-(alkylthioalkyl)aminoandrost-5-en-3β-ols and the acyl derivatives thereof are prepared by condensation of the corresponding 17-keto starting material with the appropriate alkylthioalkylamine, reduction of the resulting 17-imines and, optionally, acylation of the amines so produced. The amines and corresponding acyl derivatives are useful pharmacological agents, e.g. anti-inflammatory and anti-fungal.

---

The present invention is concerned with steroidal amino sulfides and the acyl derivatives thereof as represented by the following structural formula

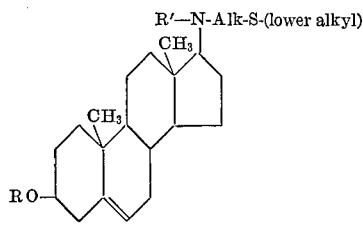

wherein R and R' can be hydrogen or a lower alkanoyl radical and Alk is a lower alkylene radical.

The lower alkyl radicals denoted in the foregoing structural representation are exemplified by methyl, ethyl, propyl, butyl, pentyl, hexyl, heptyl and the branched-chain radicals thereof.

Typical of the lower alkylene radicals denoted in that formula are ethylene, trimethylene, tetramethylene, pentamethylene and the corresponding branched-chain isomers.

Representative of the lower alkanoyl radicals depicted above are formyl, acetyl, propionyl, butyryl, valeryl, caproyl, heptanoyl and the branched-chain groups corresponding.

Equivalent to the instant amines for the purposes of this invention are the corresponding non-toxic acid-addition and quaternary salts. These salts are typified by the tartrate, maleate, ascorbate, succinate, phthalate, oxalate, citrate, lactate, hydrochloride, hydrobromide, sulfate, nitrate, phosphate, methochloride, methobromide, methiodide, methosulfate, ethiodide and ethosulfate.

Manufacture of the novel compounds of this invention involves, firstly, the condensation of a 17-keto steroidal starting material with an alkylthioalkylamine. A specific example is the reaction in benzene of 3β-hydroxyandrost-5-en-17-one with 3-methylthiopropylamine in the presence of p-toluenesulfonic acid to afford 17-(3-methylthiopropyl)iminoandrost-5-en-3β-ol. Reduction of those imine intermediates, suitably with a metallic hydride reducing agent such as lithium aluminum hydride, affords the corresponding amines. The latter 17-(3-methylthiopropyl)iminoandrost-5-en-3β-ol is thus contacted with lithium aluminum hydride in dioxane to produce 17β-(3-methylthiopropyl)aminoandrost-5-en-3β-ol.

The acyl derivatives of the present invention are obtained by contacting an instant amine with the appropriate acid or the corresponding anhydride or halide. In the case of the formyl compounds, a particularly convenient acylating mixture is formic acid and acetic anhydride. The aforementioned 17β-(3-methylthiopropyl)aminoandrost-5-en-3β-ol is thus warmed with a mixture of formic acid and acetic anhydride to yield 17β-(3-methylthiopropyl)formamidoandrost-5 - en - 3β-ol 3-formate.

Saponification of the latter ester-amides is a convenient method of obtaining the instant hydroxy-amides. The aforementioned 17β - (3 - methylthiopropyl)formamidoandrost-5-en-3β-ol 3-formate, for example, is heated briefly with aqueous potassium carbonate in methanol, thus producing 17β-(3-methylthiopropyl)formamidoandrost-5-en-3β-ol.

The compounds of this invention exhibit valuable pharmacological properties. They are, for example, anti-inflammatory agents as is evidenced by their ability to inhibit the granuloma formation associated with inflammatory states. In addition, they are anti-fungal agents in view of their ability to inhibit the growth of organisms such as *Trichophyton rubrum* and *Microsporum audouini*.

The anti-inflammatory property of the instant compounds is specifically illustrated by the activity of 17β-(3-methylthiopropyl)aminoandrost-5-en-3β-ol and 17β-(3-methylthiopropyl)formamidoandrost-5 - en - 3β-ol as determined by the following assay procedure adapted from the method of Dulin, Proc. Soc. Exp. Biol. Med., 90, 115 (1955):

Male rats weighing 180–220 g. are adrenalectomized and arranged into groups of 6 animals each. The animals are maintained on 0.86% saline drinking water for the duration of the test and are supplemented with 5% aqueous glucose for the first 24 hours following adrenalectomy. On the day following the operation four cotton dental pellets, with an average weight of approximately 6 mg., are individually implanted in a bilateral position in the pectoral and dorsal lateral neck regions of each rat. The test compound, dissolved or suspended in a saline-wetting agent mixture or in corn oil, is administered by stomach tube on the day of the pellet implantation and the treatment is repeated on the following day. On the day following the last treatment the rats are sacrificed and the pellets with associated granuloma tissue are carefully dissected, dried and weighed. These weights are compared with those from a group of control animals concurrently treated as above save for omission of the test compound. The test compound is rated active if it causes a significant decrease ($P \leq 0.05$) in the weight of the encapsulated tissue surrounding the cotton pellet.

The assay used to detect anti-fungal activity is described as follows:

The test compound is dissolved or suspended in melted Sabouraud agar and is held at 80° C. for 20 minutes. Dilutions are made from this preparation in melted Sabouraud agar in order to give concentrations of the test substance of 1000, 100, 10 to 1 mcg./ml. in the agar. The agar is permitted to cool and solidify and is then surface inoculated with a suspension of spores of *Tricophyton rubrum* or *Mycosporum audouini*. The inoculated media are incubated media are incubated at room temperature for 6–7 days, then are examined grossly for the presence or absence of growth of the test organism. Control preparations lacking the test compound are employed for comparative purposes. The activity of the compound is recorded as mcg. of the compound/ml. of the agar which completely prevents visible growth of the test organism.

The invention will appear more fully from the examples which follow. These examples are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight except where otherwise noted.

EXAMPLE 1

A mixture containing 14.4 parts of 3β-hydroxyandrost-5-en-17-one, 10.5 parts of 3-methylthiopropylamine and 264 parts of benzene is slowly distilled until anhydrous, at which time 1.9 parts of p-toluenesulfonic acid monohydrate is added. The resulting mixture is heated at the reflux temperature for about 20 hours, during which time the water of reaction is removed by a separator. The addition of approximately 1.5 parts of pyridine to the reaction mixture results in formation of a gel, which is diluted with methanol and hexane in order to promote crystallization. The resulting solid product is further purified by recrystallization from ethyl acetate, thus affording pure 17-(3-methylthiopropyl)iminoandrost - 5 - en - 3β - ol. This compound exhibits an optical rotation, in chloroform, of +27.5° and is further characterized by the following structural formula

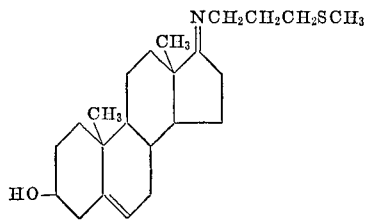

EXAMPLE 2

When an equivalent quantity of 2-ethylthioethylamine is substituted in the procedure of Example 1, there is obtained 17-(2-ethylthioethyl)iminoandrost-5-en-3β-ol.

EXAMPLE 3

To a mixture of 4 parts of lithium aluminum hydride with 100 parts of dioxane is added, dropwise over a period of about 30 minutes, a solution of 10 parts of 17-(3-methylthiopropyl)iminoandrost-5-en-3β-ol in 250 parts of dioxane. The resulting reaction mixture is heated at the reflux temperature for about 6 hours, then is cooled and diluted successively with a solution of 4 parts of water in 20 parts of dioxane, 3 parts by volume of 20% aqueous sodium hydroxide and 14 parts of water. The resulting precipitated inorganic salts are removed by filtration and washed on the filter with dioxane. The combined filtrate and washings are concentrated to dryness under reduced pressure to afford an oily product. Purification of that oily material by recrystallization from aqueous acetone affords 17β-(3-methylthiopropyl)aminoandrost-5-en-3β-ol, melting at about 97–100°. It displays an optical rotation, in chloroform, of −41° and is further characterized by the following structural formula

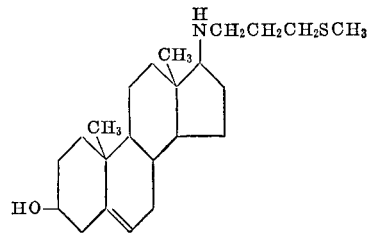

EXAMPLE 4

The substitution of an equivalent quantity of 17-(2-ethylthioethyl)iminoandrost - 5 - en - 3β - ol in the procedure of Example 3 results in 17β-(2-ethylthioethyl) aminoandrost-5-en-3β-ol.

EXAMPLE 5

A mixture containing 2 parts of 17β-(3-methylthiopropyl)aminoandrost - 5 - en - 3β - ol, 15.9 parts of formic acid and 13 parts of acetic anhydride is heated on the steam bath for about 4 hours, then is cooled and diluted with water. The oily material which separates is extracted into a 2:5 mixture of methanol and ether and that extract is concentrated to dryness under reduced pressure, thus affording needle-like crystals of the product. That material melts at about 149–150° and is purified further by recrystallization from ethyl acetate-methanol, thus affording pure 17β-(3-methylthiopropyl)formamidoandrost-5-en-3β-ol 3-formate. This compound is represented by the following structural formula

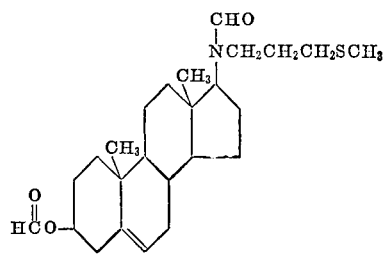

EXAMPLE 6

By substituting an equivalent quantity of 17β-(2-ethylthioethyl)aminoandrost-5-en-3β-ol and otherwise proceeding according to the processes of Example 5, there is obtained 17β-(2-ethylthioethyl)formamidoandrost-5-en-3β-ol 3-formate.

EXAMPLE 7

To a solution of 1 part of 17β-(3-methylthiopropyl)-formamidoandrost-5-en-3β-ol 3-formate in 48 parts of warm methanol is added a solution of 0.5 part of potassium carbonate in 10 parts of water. The resulting reaction mixture is heated at the reflux temperature for about 5 minutes, then is allowed to stand at room temperature for about 20 minutes. At the end of that time the mixture is diluted with water and cooled to 0–5° in order to effect crystallization. The resulting white platelet-like crystals are collected by filtration and washed with water, thus affording 17β - (3-methylthiopropyl)formamidoandrost-5-en-3β-ol. This compound displays an optical rotation, in chloroform, of −72.5° and is represented by the following structural formula

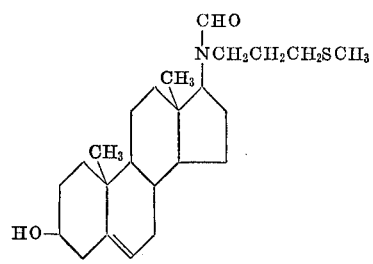

EXAMPLE 8

When an equivalent quantity of 17β-(2-ethylthioethyl)-formamidoandrost-5-en-3β-ol 3-formate is substituted in the procedure of Example 7, there is produced 17β-(2-ethylthioethyl)formamidoandrost-5-en-3β-ol.

What is claimed is:

1. A compound of the formula

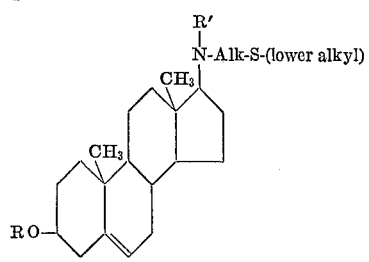

wherein R is selected from the group consisting of hydrogen and a formyl radical, R' is a formyl radical when R is a formyl radical, R' is a member of the class consisting of hydrogen and a formyl radical when R is hydrogen and Alk is a lower alkylene radical.

2. As in claim 1, a compound of the formula

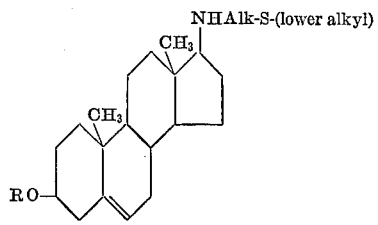

wherein Alk is a lower alkylene radical.

3. As in claim 1, a compound of the formula

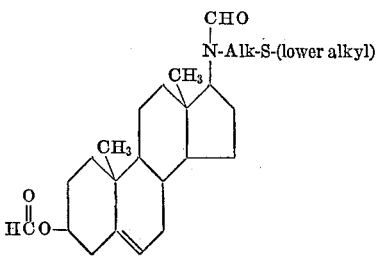

wherein Alk is a lower alkylene radical.

4. As in claim 1, a compound of the formula

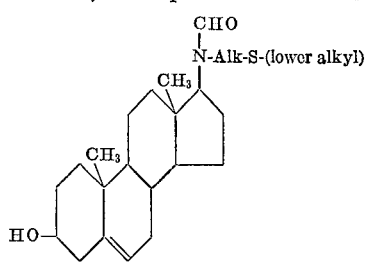

wherein Alk is a lower alkylene radical.

5. As in claim 1, a compound of the formula

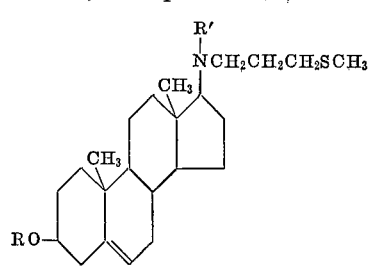

wherein R is selected from the group consisting of hydrogen and a formyl radical, R' is a formyl radical when R is a formyl radical and R' is a member of the class consisting of hydrogen and a formyl radical when R is hydrogen.

6. As in claim 1, a compound of the formula

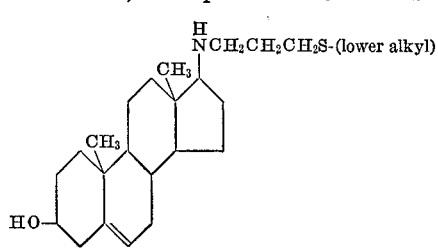

7. As in claim 1 the compound which is 17β-(3-methylthiopropyl)aminoandrost-5-en-3β-ol.

8. As in claim 1 the compound which is 17β-(3-methylthiopropyl)formamidoandrost-5-en-3β-ol 3-formate.

9. As in claim 1, the compound which is 17β-(3-methylthiopropyl)formamiodandrost-5-en-3β-ol.

10. 17-(3-methylthiopropyl)iminoandrost-5-en-3β-ol.

References Cited

Davis et al., Journ. Chem. Soc., ©, 1966, pp. 1688–97, pp. 1688–91 pertinent.

LEWIS GOTTS, Primary Examiner

E. G. LOVE, Assistant Examiner

U.S. Cl. X.R.

424—238

UNITED STATES PATENT OFFICE
CERTIFICATE OF CORRECTION

Patent No. 3,636,014　　　　　　Dated January 18, 1972

Inventor(s)　　Paul D. Klimstra

It is certified that error appears in the above-identified patent and that said Letters Patent are hereby corrected as shown below:

Column 1, title, "3-ols," should be -- 3β-ols, --.

Column 3, line 11, "incubated media are incubated" should be -- incubated --.

Column 5, third formula,

" 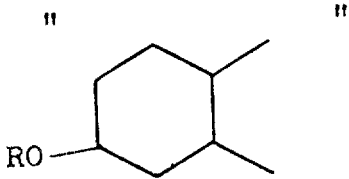 " should be -- 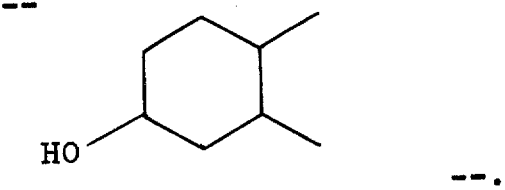 --.

Column 6, line 45, "formamidioandrost-" should be -- formamidoandrost- --.

Column 6, line 47, "formamiodandrost-" should be -- formamidoandrost- --.

Signed and sealed this 18th day of July 1972.

(SEAL)
Attest:

EDWARD M. FLETCHER, JR.　　　　　　ROBERT GOTTSCHALK
Attesting Officer　　　　　　　　　　Commissioner of Patents